(No Model.)
DE WANE B. SMITH.
HARROW ATTACHMENT.
No. 393,344. Patented Nov. 20, 1888.
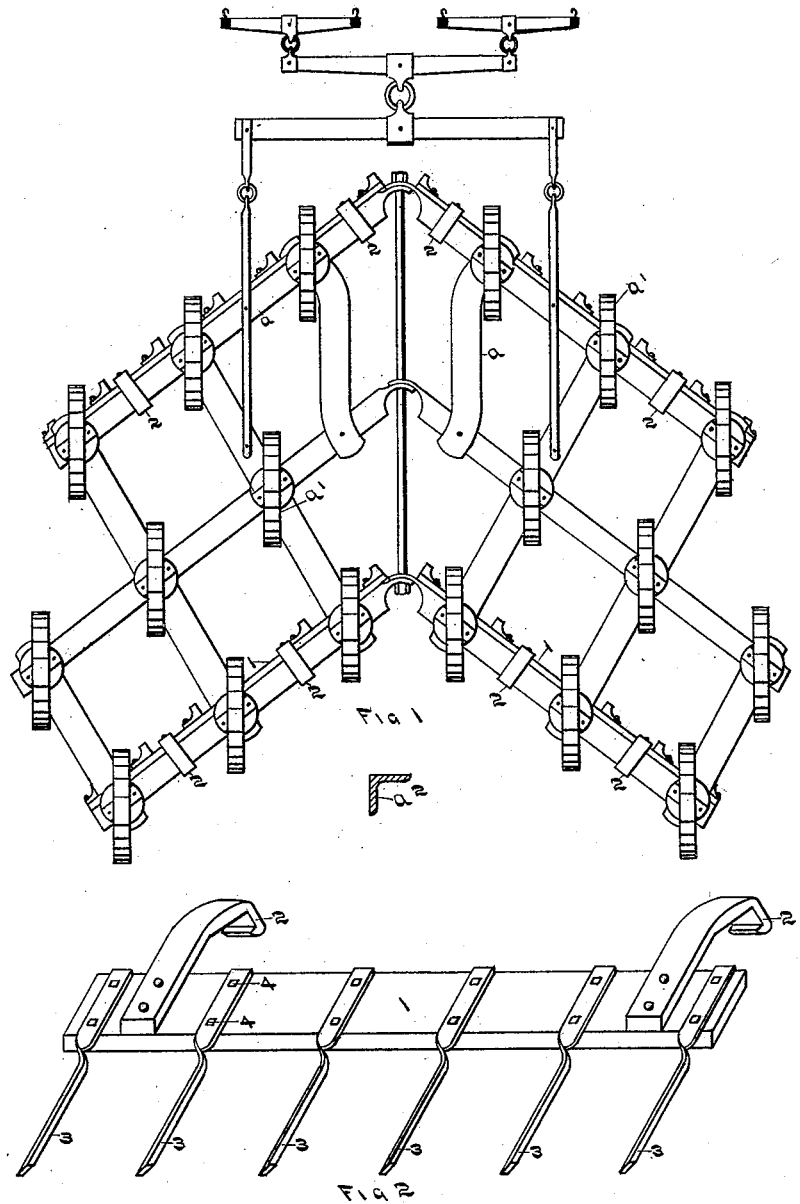
WITNESSES:
Edwin M. Risley,
L. F. Stuart
INVENTOR
D. B. Smith
BY Risley Luin & Perry
ATTORNEY

UNITED STATES PATENT OFFICE.

DE WANE B. SMITH, OF UTICA, NEW YORK.

HARROW ATTACHMENT.

SPECIFICATION forming part of Letters Patent No. 393,344, dated November 20, 1888.

Application filed February 16, 1887. Serial No. 227,831. (No model.)

*To all whom it may concern:*

Be it known that I, DE WANE B. SMITH, of Utica, in the county of Oneida and State of New York, have invented certain new and useful Improvements in Harrow Attachments; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to a device attached to harrow-frames for smoothing and leaving the ground substantially even after a harrow passes the same; and it consists in the mechanism hereinafter more fully pointed out and claimed.

In the accompanying drawings, Figure 1 represents a top view of a spring-tooth harrow. Fig. 2 is a front view of my detachable smoother.

Heretofore one of the troubles encountered in the use of a spring-tooth harrow is that the harrow leaves the ground in ridges, and renders this class of harrows less desirable where the land is seeded, and in many instances these ridges are found to be objectionable when the land is seeded with grass or clover. I overcome these troubles by providing two or more smoothers with teeth attached, as hereinafter more fully pointed out.

In the accompanying drawings, *a a* represent the two sections of an ordinary jointed harrow-frame, with spring-teeth *a' a'* mounted on the frame, the lower draft-bars being formed of angle-iron, as shown in $a^2$. Any other construction of frame may be used, the purpose of my invention being to apply the smoothing device to any spring-tooth harrow.

The central feature of my invention is the attachable and detachable smoother I, consisting of a bar of substantially the same length as the wing of the harrow to which the same is to be attached. On the edge of the bar I provide projecting hooks 2 2, which are riveted or bolted to the bar in a firm and substantial manner, the upper end of the hook being constructed to engage the harrow-frame. On this bar I provide a series of projecting teeth, 3, Fig. 2, which are rigidly held to the bar by bolts or rivets 4 4. These teeth should be of suitable length and of the required number to even the land stirred up by the spring-teeth on the harrow-frame. In the drawings the teeth are shown to be partly twisted or bent, forming what may be considered cutting edges, although I do not consider this as indispensable. Any other shape of teeth may answer the purpose, so long as they are rigidly held in or to the attachable or detachable bar. Two or more of the attachable and detachable bars provided with hooks and teeth are placed on the harrow-frame, preferably on the wings provided with the last row of teeth, as shown in Fig. 1, although more may be used, if desired.

What I claim as new, and desire to secure by Letters Patent, is—

The combination, with a harrow-frame, of the attachable and detachable bars provided with teeth and hooks for engaging the frame, substantially as set forth, for the purposes stated.

In witness whereof I have affixed my signature in presence of two witnesses.

DE WANE B. SMITH.

Witnesses:
EDWIN H. RISLEY,
L. F. STUART.